Jan. 27, 1959  H. E. KARIG ET AL  2,871,082
DISHWASHER DOOR WITH AIR CIRCULATING MEANS AND MOISTURE TRAP
Filed Dec. 31, 1956  2 Sheets-Sheet 1
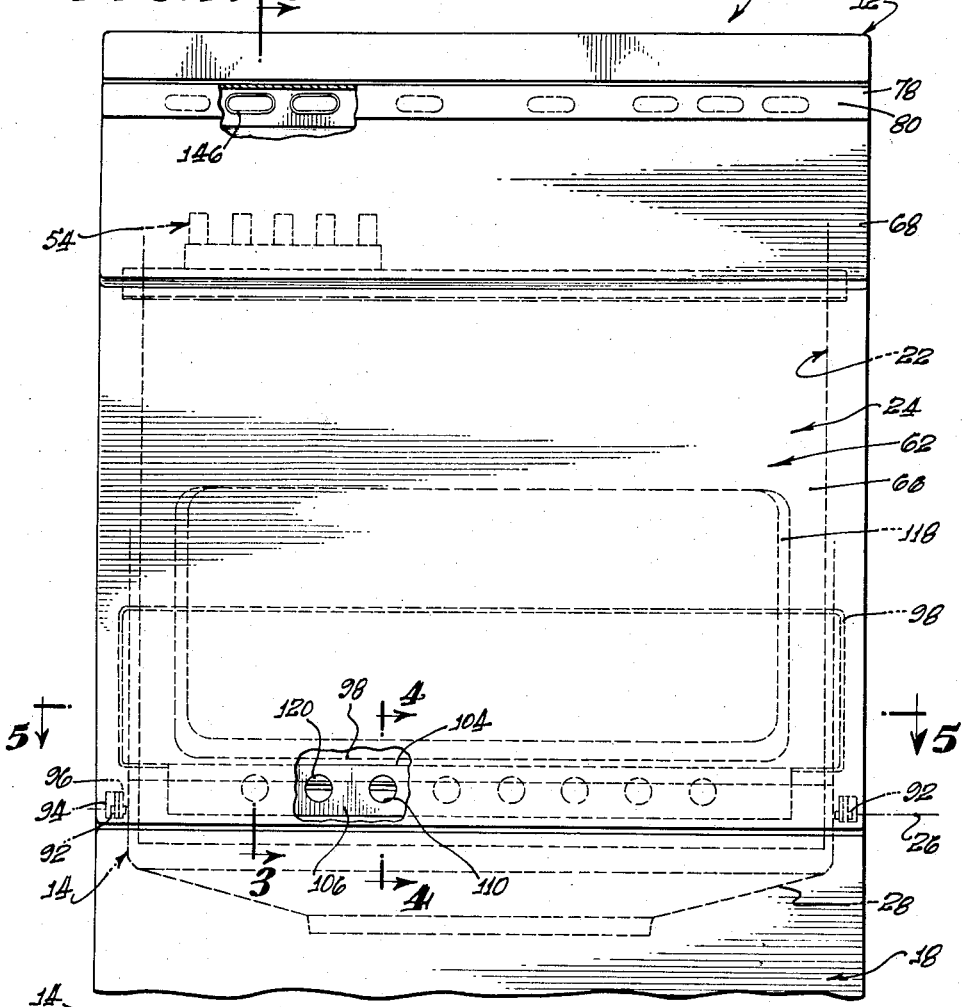
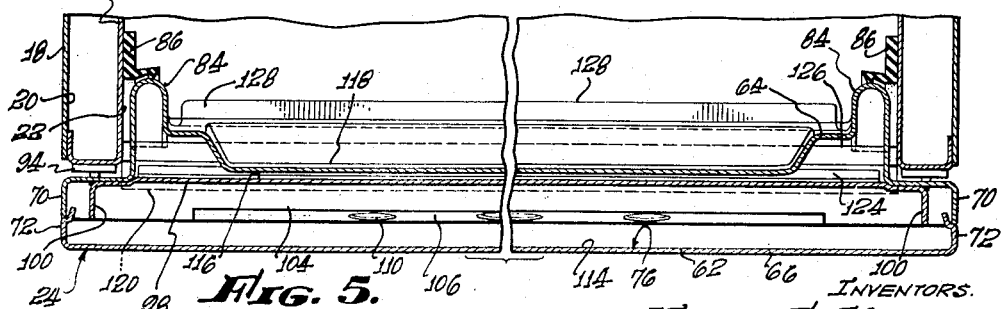
INVENTORS.
HORACE E. KARIG,
HERBERT L. SMITH,
By their Attorneys.
HARRIS, KIECH, FOSTER & HARRIS.

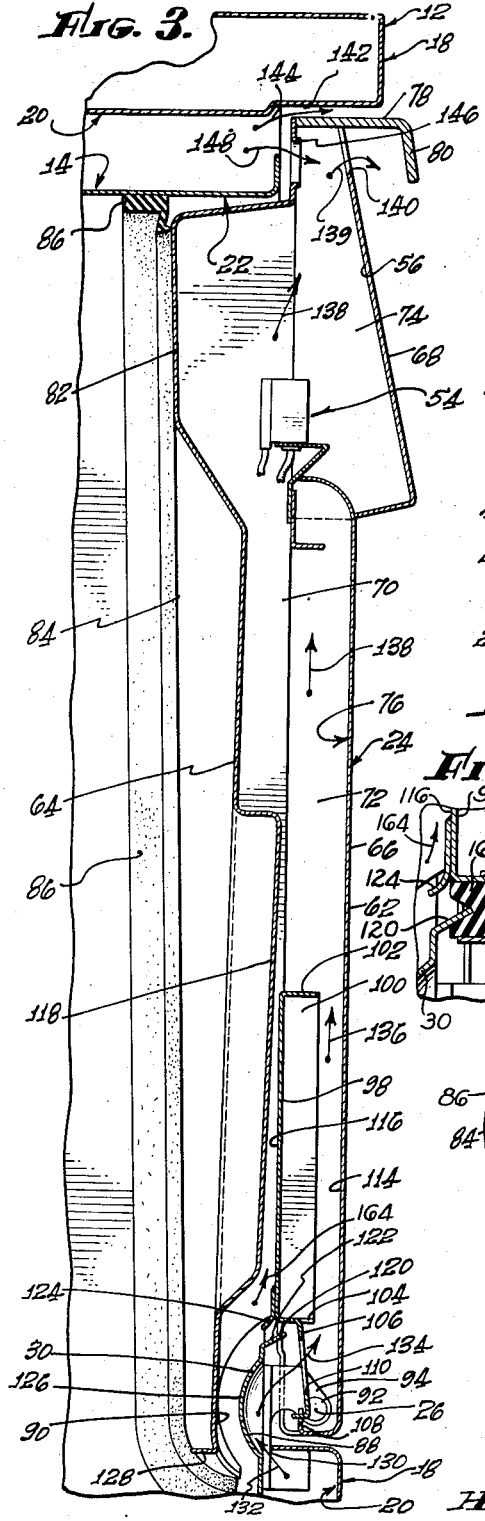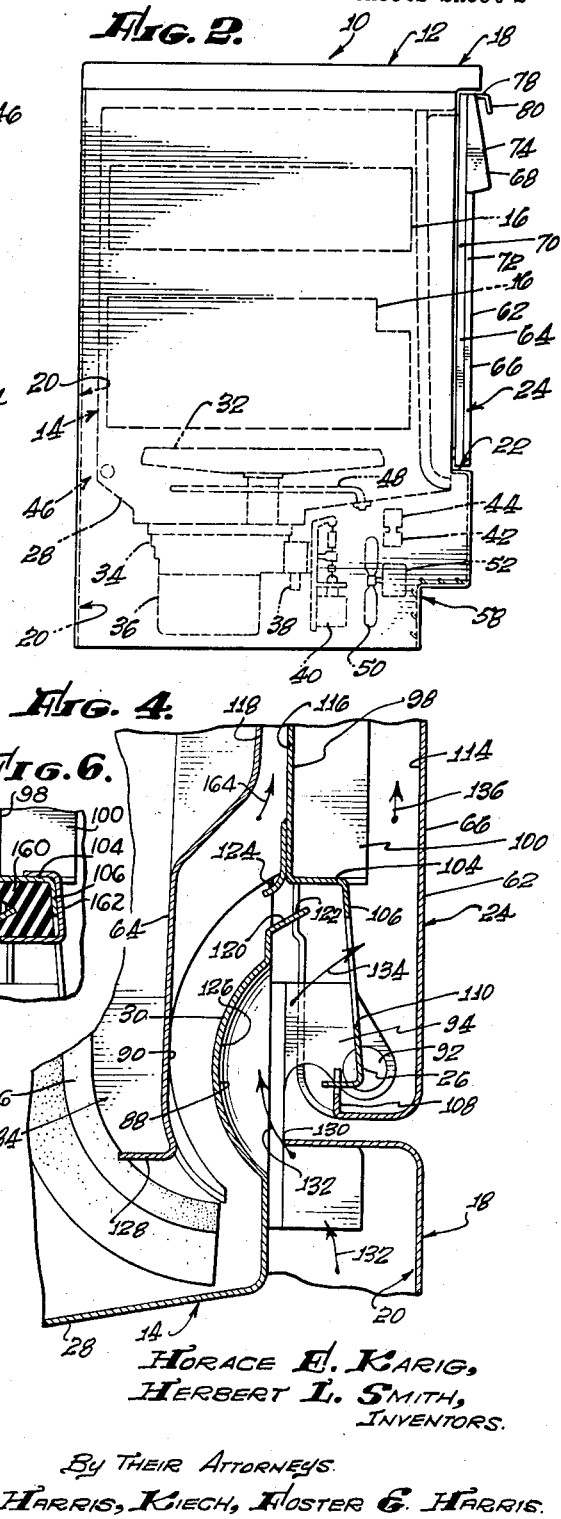
Jan. 27, 1959    H. E. KARIG ET AL    2,871,082
DISHWASHER DOOR WITH AIR CIRCULATING MEANS AND MOISTURE TRAP
Filed Dec. 31, 1956    2 Sheets-Sheet 2
Horace E. Karig,
Herbert L. Smith,
    Inventors.
By their Attorneys
Harris, Kiech, Foster & Harris.

United States Patent Office 2,871,082
Patented Jan. 27, 1959

2,871,082

DISHWASHER DOOR WITH AIR CIRCULATING MEANS AND MOISTURE TRAP

Horace E. Karig, Pasadena, and Herbert L. Smith, Gardena, Calif., assignors to Waste King Corporation, Los Angeles, Calif., a corporation of California Application December 31, 1956, Serial No. 631,930

22 Claims. (Cl. 312—213)

The present invention relates in general to dishwashers and, more particularly, to a dishwasher provided with a door at the front thereof for access to the interior of the dishwasher.

In general, the invention contemplates a dishwasher which includes a housing having a dish chamber enclosed by a cabinet, the front of the housing being provided with a doorway for access to the interior of the dish chamber and the dish chamber providing at the bottom thereof a sump having a front wall adjacent the bottom of the doorway. The dishwasher includes a door mounted on the housing for movement between open and closed positions about a horizontal pivot axis adjacent the bottom of the door. In accordance with co-pending application Serial No. 482,239, filed January 17, 1955, by Horace E. Karig, and assigned to the same assignee as the present application, the cabinet is spaced outwardly from the dish chamber and the door includes spaced front and rear walls, ambient air being circulated throughout the space between the dish chamber and the cabinet, and throughout the space between the front and rear walls of the door, during drying of dishes within the dish chamber so as to cool the walls of the dish chamber, including the rear wall of the door. At the same time, the air within the dish chamber is caused to circulate, by convection, upwardly through the central portion of the dish chamber over any dishes in racks therein, and then outwardly and downwardly along the inner surfaces of the walls of the dish chamber, including the rear wall of the door. As more fully discussed in said co-pending application, the air circulated throughout the interior of the dish chamber in this manner evaporates moisture from the dishes as it rises in the dish chamber and such moisture then condenses on the walls of the dish chamber, including the rear wall of the door, as the moisture-laden air flows outwardly and downwardly adjacent the inner surfaces of the walls of the dish chamber, such condensation occurring because of the fact that the walls of the dish chamber are cooled by the air circulated throughout the space between the dish chamber and the cabinet and the space between the front and rear walls of the door. Thus, substantially no moisture escapes from the dish chamber during the drying operation and, furthermore, the dishes are dried with relatively hot and relatively sterile air within the dish chamber, ambient air being excluded from the dish chamber during the drying operation and being circulated only throughout the spaces between the dish chamber and the cabinet and between the front and rear walls of the door, for the purpose of cooling the walls of the dish chamber to promote condensation of moisture thereon from the air being circulated by convection throughout the interior of the dish chamber in the manner set forth. The space between the front and rear walls of the door may provide, adjacent the top of the door, a control chamber for the controls of the dishwasher, such as a timer, electrical indicators for indicating the operation of the dishwasher, and the like, all as more fully disclosed in the co-pending application of Bertram Given and Walter Peglow, Serial No. 625,398, filed November 30, 1956, and assigned to the same assignee as the present application.

The invention further contemplates a dishwasher wherein the front and rear walls of the door straddle and are spaced from the front wall of the sump when the door is closed and wherein the door is hinged to the dishwasher housing for pivotal movement about a horizontal axis adjacent the front wall of the sump and at a level below the upper edge thereof, an object in this connection being to provide a dishwasher wherein the hinge axis of the door is located at a level below the upper edge of the front wall of the sump and forwardly of the front wall of the sump.

The invention still further contemplates a dishwasher wherein the door is sealed by a gasket along its upper and vertical edges, but which is unsealed along its lower edge, although it may be sealed along its lower edge also in one embodiment of the invention.

An important object of the present invention is to provide means at the bottom of the door for preventing the escape of moisture over the upper edge of the front wall of the sump during the washing and rinsing operations or events in the operating cycle of the dishwasher, and particularly for preventing the escape of moisture at the beginning of each washing and rinsing operation, at which time initial agitation of the water within the sump incident to circulating it over the dishes in the racks within the dish chamber produces an upward surge within the space between the front wall of the sump and the rear wall of the door. This upward surge is due in part directly to the mechanical action of the impeller for circulating the water throughout the dish chamber on the water as the impeller is started, but is due primarily to the liberation of steam from the water and thermal expansion of air in the dish chamber as circulation of hot water is initiated, this producing a transient pressure increase within the dish chamber which tends to force water upwardly in the space between the rear wall of the door and the front wall of the sump.

More particularly, an important object of the invention is to provide a moisture trap within the door which acts as a surge chamber serving to absorb the upward surges in the space between the rear wall of the door and the front wall of the sump, and which serves to collect and drain back into the sump any water drops or droplets carried upwardly by such upward surges.

Another object is to provide a moisture trap having means for throttling any upward surge occurring in the space between the rear wall of the door and the front wall of the sump to absorb or dissipate such upward surge.

Still another object is to provide means within the door for draining back into the sump any water drops or droplets carried up into the surge chamber.

A further object is to provide a door which includes an intermediate wall located between and spaced from the front and rear walls of the door and located at a level between the upper and lower edges of the front and rear walls of the door, this intermediate wall being located at a level above the front wall of the sump and being located in close proximity to the rear wall of the door so that upward flow from the sump through the space between the rear wall of the door and the front wall of the sump into the space between the rear wall of the door and the intermediate wall thereof is throttled by the close spacing between the intermediate wall of the door and the rear wall thereof, whereby any such upward surge is absorbed in the surge chamber provided by this construction.

A further object of the invention is to provide a door structure wherein the rear wall of the door includes a forwardly offset portion intermediate its upper and lower edges and located at a level above the front wall of the sump when the door is closed, the intermediate wall of the door being located in close proximity to this forwardly offset portion of the rear wall thereof.

An additional object of the invention is to provide a dishwasher wherein the space between the front wall of the sump and the rear wall of the door is slightly tortuous so that any upward surge occurring therein tends to direct water drops or droplets against such walls for subsequent drainage back into the sump.

Another object is to provide a construction wherein the lower edge of the rear wall of the door extends rearwardly to deflect water draining down the inner or rear surface of the rear wall of the door inwardly or rearwardly into the dish chamber to minimize entrainment of water in any stream of air and/or steam escaping from the dish chamber between the front wall of the sump and the rear wall of the door.

Another important object of the invention is to provide a door having a drainage lip carried by the intermediate wall of the door and extending downwardly and rearwardly, such drainage lip being located at a level above the front wall of the sump and terminating rearwardly of the upper edge of the front wall of the sump so that any water droplets carried upwardly into the relatively narrow space between the intermediate wall of the door and the adjacent, forwardly offset portion of the rear wall of the door are deflected back into the sump by such drainage lip.

A still further object of the invention is to provide the upper wall of the sump with an upwardly and forwardly inclined flange along its upper edge, such flange being directly below and substantially parallel to the drainage lip and being in close proximity thereto. Thus, in one embodiment of the invention, there is provided an escape passage, for air and steam within the dish chamber, which diverges upwardly and forwardly from the narrow surge absorbing space or chamber between the rear and intermediate walls of the door into a space between the intermediate and front walls of the door. With this construction, the discharge of water droplets over the upper edge of the front wall of the sump is substantially completely eliminated, while still providing the escape passage mentioned, which escape passage serves to dissipate any pressure surge in the dish chamber due to the release of steam from the water or expansion of air in the dish chamber upon initial agitation at the beginning of a washing or rinsing operation.

An additional object in connection with various embodiments is to provide an escape passage for air and/or steam which extends upwardly between the rear and intermediate walls of the door to the top thereof, this escape passage replacing or supplementing the escape passage mentioned above.

Another object of the invention is to provide a construction wherein the space between the front and rear walls of the door above the intermediate wall thereof communicates with the space between the intermediate and front walls of the door, this latter space communicating, in turn, with the space existing between the front wall of the sump and the front wall of the door when the door is closed, and the space between the front wall of the sump and the front wall of the door communicating with the space between the dish chamber and the cabinet. With this construction, air discharged by the air flowing means, such as a fan, within the space between the dish chamber and the cabinet circulates upwardly through the door, by way of the space between the front wall of the sump and the front wall of the door, the space between the intermediate wall of the door and the front wall thereof, and the space between the rear and front walls of the door above the intermediate wall thereof, as well as throughout the space between the dish chamber and the cabinet, such air circulation serving to cool the walls of the dish chamber, including the rear wall of the door, to produce moisture condensation on the inner surfaces of the dish chamber walls during the drying operation, as hereinbefore outlined.

Another object is to provide a door the front wall of which is provided with an air outlet adjacent its upper edge, the air circulated upwardly through the door in the manner hereinbefore discussed escaping through such air outlet, and the air and/or steam flowing through the aforementioned escape passage between the rear and intermediate walls of the door also escaping through such air outlet.

Another object is to provide a door the rear wall of which is provided with an air inlet adjacent the upper edge thereof, this air inlet communicating with the space between the top of the dish chamber and the top of the cabinet when the door is closed.

With this construction, the air circulating throughout the space between the dish chamber and the cabinet during the dish drying operation escapes from this space through the air inlet in the rear wall of the door into the space between the front and rear walls of the door, the air escaping from this latter space through the outlet in the front wall of the door.

Another object is to provide a gap between the upper edge of the door and the cabinet when the door is closed, this gap also communicating with the space between the dish chamber and the cabinet to further permit the escape of air from such space as air is circulated therethrough during the drying operation.

The foregoing objects, advantages, features and results of the present invention, together with various other objects, advantages, features and results thereof which will be evident to those skilled in the dishwasher art in the light of this disclosure, may be attained with the exemplary embodiment of the invention described in detail hereinafter and illustrated in the accompanying drawings, in which:

Fig. 1 is a front elevational view of a dishwasher embodying the invention;

Fig. 2 is a side elevational view of the dishwasher on a reduced scale;

Fig. 3 is a fragmentary sectional view on an enlarged scale taken along the arrowed line 3—3 of Fig. 1;

Fig. 4 is a further enlarged, fragmentary sectional view taken along the arrowed line 4—4 of Fig. 1;

Fig. 5 is an enlarged, fragmentary sectional view taken along the arrowed line 5—5 of Fig. 1 of the drawings; and Fig. 6 is a fragmentary sectional view duplicating a portion of Fig. 4, but illustrating an alternative embodiment of the invention.

Referring particularly to Figs. 1 and 2 of the drawings, the numeral 10 designates generally a dishwasher of the invention provided with a housing 12 which includes a dish chamber 14 having therein racks 16 for supporting dishes to be washed, rinsed and dried. The housing 12 includes an outer cabinet 18 which encloses the dish chamber 14 and which is spaced from the dish chamber on all sides, including the top and bottom of the dish chamber, to provide a space 20 completely enveloping the dish chamber. The cabinet 18 may be provided with a bottom wall, or, alternatively, the bottom of that portion of the space 20 which is below the dish chamber 14 may merely be defined by a floor on which the dishwasher 10 rests. Similarly, if the dishwasher 10 is built into a kitchen cabinet, or the like, such kitchen cabinet may form the cabinet 18, it being immaterial to the present invention whether the cabinet 18 is an integral part of the dishwasher, or a part of the room in which the dishwasher is installed, the important thing being that the dish chamber 14 is enveloped by the space 20 in either event.

The dishwasher housing 12 is provided at the front thereof with a doorway 22 for access to the interior of the dish chamber 14 so that dishes may be placed in and removed from the racks 16. This doorway is adapted to be closed by a door 24 which is mounted on the housing 12 for movement between open and closed positions about a horizontal pivot axis 26 adjacent the lower edge of the door. The structure of the door 24 will be discussed in detail hereinafter.

The dish chamber 14 provides a sump 28 the bottom wall of which is formed by the bottom wall of the dish chamber. The rear and side walls of the sump 28 are formed by portions of the rear and side walls of the dish chamber 14, and the sump is provided with a front wall 30 at the bottom of the doorway 22, this front wall being discussed in more detail hereinafter. Within the sump 28 is an impeller 32 for circulating water from the sump upwardly throughout the dish chamber 14 and over any dishes in the racks 16 during the washing and rinsing events of the operating cycle of the dishwasher 10. This impeller may be of any suitable type, it being of the reaction type in the particular construction illustrated and being supplied with water from the sump 28 by a pump 34 the inlet of which communicates with the sump and which is driven by an electric motor 36. The outlet of the pump 34 is adapted to be connected either to the impeller 32 to spray water upwardly throughout the dish chamber 14, or to a drain 38, a selector valve, not shown, controlled by a solenoid 40 being provided to perform this function, as more fully disclosed in the copending application of Robert M. Getchell, Horace E. Karig and John A. Fay, Serial No. 631,150, filed December 28, 1956, and assigned to the same assignee as the present application.

The sump 28 is filled with water to a predetermined level by a fill valve 42 controlled by a solenoid 44, a float switch 46 being provided to prevent overflow. Within the sump 28 below the impeller 32 is a resistance heating element 48 for heating the water and/or air in the dish chamber 14. Within the space 20 below the dish chamber 14 is a fan 50 driven by a motor 52 for circulating air throughout the space 20, and, as hereinafter discussed, through the door 24, during the drying event of the operating cycle.

Preferably the dishwasher 10 is fully automatic and is provided with various controls, such as a timer, electrical indicators for indicating the operation of the dishwasher, and the like, such controls being designated generally by the numeral 54 in Fig. 3 of the drawings and being located in a controls compartment 56 within the door 24 at the top thereof, as more fully disclosed in the aforementioned co-pending application of Bertram Given and Walter Peglow. The timer included in the controls 54 operates the various elements of the dishwasher 10 at the proper points in the operating cycle thereof to secure completely automatic operation.

Considering briefly the general operation of the dishwasher 10 prior to considering the specific structure of the door 24 and its operation, the fill valve 42 is opened at the beginning of each washing and rinsing operation to fill the sump 28 with water to a predetermined level, the float switch 46 preventing overflow. Preferably, there is at least one washing operation, which may be preceded by a preliminary rinsing operation, there being one or more rinsing operations subsequent to the main washing operation. After the sump 28 has been filled, the pump motor 36 is energized, with its outlet connected to the impeller 32, to deliver water from the sump to the impeller, the latter spraying the water throughout the dish chamber 14 and over any dishes in the racks 16 therein. During the main washing operation, the water thus circulated over the dishes may have suitable additives, such as detergents, soaps, water softeners, and the like, therein. Similarly, additives may be used during one or more of the rinsing operations for water softening purposes, surface tension reduction, and the like. At the end of each washing and rinsing operation, the solenoid 40 is energized to connect the pump 34 to the drain 38, thereby discharging the water from the sump 28 in preparation for the next event of the operating cycle. During each washing and rinsing operation, the heating element 48 may be energized to heat the water to a predetermined temperature if the temperature of the water supplied to the dishwasher is not sufficiently high.

As more fully disclosed in said co-pending application Serial No. 482,239, at the end of the last rinsing operation, the heating element 48 and the fan motor 52 are energized, the heating element increasing the temperature of the air in the dish chamber 14 and causing the air to rise centrally of the dish chamber by convection. As the air rises centrally of the dish chamber in this manner, it evaporates water from the dishes in the racks 16. Subsequently, the moisture-laden air flows outwardly below the top wall of the dish chamber 14 and then downwardly along the front, rear and side walls thereof, the front wall of the dish chamber being defined by the door 24 as will be described. The various walls of the dish chamber 14, including the front wall thereof defined by the door 24, are cooled by circulating ambient air throughout the space 20, including that portion of this space which is within the door 24. The cabinet 18 is provided with an air inlet 58 adjacent the fan 50, and is provided with an air outlet, to be discussed hereinafter, adjacent the top of the door 24. Thus, the fan 50 circulates ambient air throughout the space 20 to maintain all of the walls of the dish chamber 14 at a temperature considerably below the temperature of the air being circulated within the dish chamber by the heating element 48. Consequently, the moisture-laden air flowing outwardly and downwardly along the walls of the dish chamber 14 is cooled so that moisture condenses therefrom on the dish chamber walls, such moisture draining downwardly into the sump 28 and being discharged out the drain 38. Thus, the dishes are dried with relatively hot air within the dish chamber 14, no ambient air being introduced into the dish chamber during the drying operation and ambient air being utilized only to cool the dish chamber walls so as to promote condensation thereon. Thus, the degree of sterility and cleanliness achieved during the washing and rinsing operations is maintained during the drying operation and, furthermore, since all of the moisture is condensed on the inner surfaces of the dish chamber walls during the drying operation, no moisture is discharged into the kitchen, or other area, in which the dishwasher 10 is used. This latter avoids steaming of walls, windows, and the like, which is important.

Referring particularly to Figs. 3, 4 and 5 of the drawings, the door 24 includes spaced front and rear walls 62 and 64, the front wall 62 including a lower panel 66 and an upper escutcheon 68 overlapping therewith. The rear wall 64, the panel 66 and the escutcheon 68 are suitably secured together and are provided at the sides of the door with mating flanges 70, 72 and 74 to enclose the sides of a space 76 between the front and rear walls 62 and 64 of the door. The top of the space 76 is suitably closed, as by a handle 78 having a forwardly and downwardly sloping flange 80 under which the operator's fingers may be inserted to open the door 24. The space 76 is open at the bottom of the door 24 for reasons which will become apparent. The controls compartment 56 forms a part of the space 76, the escutcheon 68 being forwardly offset and the rear wall 64 of the door being provided with a rearwardly offset portion 82 to provide an enlarged controls compartment.

The rear wall 64 of the door is provided with rearwardly offset ribs 84 extending upwardly and downwardly along the sides of the door 24, as best shown in Fig. 5 of the drawings. Set in the doorway 22 is a gasket 86 which is engaged by the rearwardly offset portion 82 and the rearwardly offset ribs 84 of the rear wall 64 when the door 24 is closed, thereby providing fluid-tight seals along the top and sides of the door, relative to the interior of the dish chamber 14. The gasket 86 does not extend across the bottom of the door 24, however, the escape of water over the front wall 30 of the sump 28 being prevented in a manner to be discussed.

When the door 24 is in its closed position, the front and rear walls 62 and 64 of the door straddle and are respectively spaced forwardly and rearwardly from the front wall 30 of the sump 28 with the lower edges of the front and rear walls of the door below the upper edge of the front wall of the sump, the space between the front wall of the sump and the front wall of the door being designated by the numeral 88 and the space between the rear wall of the door and the front wall of the sump being designated by the numeral 90. The pivot axis 26 is located forwardly of the front wall 30 of the sump 28 and below the upper edge of such wall, as best shown in Fig. 4 of the drawings, thereby providing a very simple pivotal connection between the door 24 and the housing 12. This pivotal connection includes pivots 92 respectively interconnecting brackets 94, Fig. 4, which are suitably secured to the front wall 30 of the sump 28 and the front wall of the cabinet 18 below the doorway 22, and brackets 96, Fig. 1, which are suitably secured to the structure of the door.

The door 24 also includes another, intermediate wall 98 which extends across the door between the upper and lower edges of the front and rear walls 62 and 64, as best shown in Figs. 1 and 5, and which is suitably secured to the rear wall 64 of the door. The intermediate wall 98 is provided along its ends or sides with forwardly extending flanges 100 and is provided along its upper and lower edges with forwardly extending flanges 102 and 104, the latter having a downward extension 106 which is suitably interlocked with an upwardly extending flange 108 on the front wall panel 66 of the door, as best shown in Fig. 4, and which is provided with one or more openings 110 for air passage therethrough as will be described.

As best shown in Fig. 3 of the drawings, the intermediate wall 98 of the door is spaced rearwardly from the front wall 62 thereof to provide an intervening space 114. Similarly, the intermediate wall 98 is spaced from, but located in close proximity to, the rear wall 64 of the door 24 to provide therebetween a relatively narrow or thin, upwardly converging space 116. The rear wall 64 of the door is provided with a forwardly offset portion 118, which extends substantially all the way across the door as shown in Fig. 5 of the drawings, to provide the desired relatively thin, upwardly converging space 116. This space 116 communicates with the space 90 between the front wall 30 of the sump 28 and the rear wall 64 of the door.

The front wall of the sump 28 terminates in an upwardly and forwardly sloping flange or lip 120 the upper, forward edge of which defines the upper edge of the front wall of the sump, the rear surface of the intermediate wall or partition 98 being located rearwardly of the upper edge of this flange. The upper edge of the flange 120 terminates in relatively close proximity to the flange 104 along the lower edge of the intermediate wall 98 to provide a relatively small passage or gap 122 connecting the space 90 rearwardly of the front wall 30 of the sump 28 with the space 88 forwardly thereof. Carried by the intermediate wall 98 and extending across the door 24 is a drainage flange or lip 124 which is generally parallel to and in relatively close proximity to the flange 120 of the front wall 30 of the sump 28 and which defines therewith an upwardly and forwardly sloping portion of the passage or gap 122, the drainage lip 124 sloping downwardly and rearwardly and terminating rearwardly of the upper edge of the front wall of the sump so as to drain back into the sump any water collecting on the intermediate wall 98.

The front wall 30 of the sump 28 is provided with a slightly rearwardly offset or bowed portion 126 intermediate its upper and lower edges. Thus, the space 90 provides a slightly tortuous passage connecting the sump 28 to the upwardly convergent space 116 between the rear and intermediate walls 64 and 98 of the door, whereby entrained water tends to impinge on the walls of the space 90 to some extent.

The lower edge 128 of the rear wall 64 of the door 24 is rearwardly offset to deflect rearwardly water running down the rear surface of the wall 64. This minimizes water entrainment in any stream of air and/or steam escaping through the space 90.

The foregoing structures cooperate to provide an effective means of preventing the escape of moisture to the exterior through the gap 122, while still permitting the escape of excess air and steam through the gap, and the manner in which this action is achieved will now be considered.

It will be assumed that conditions within the dish chamber 14, when the dishwasher 10 is in operation to wash or rinse dishes in the rack 16, are such as to tend to produce an upward surge from the sump 28 into the space 90 between the front wall 30 of the sump and the rear wall 64 of the door. Such an upward surge may, for example, be due to the liberation of steam from the water in the sump 28 and thermal expansion of air in the dish chamber 14 as the impeller 32 starts to spray hot water upwardly throughout the dish chamber, the steam being held in solution in the water until such time as the water is agitated by the pump 34 and the impeller, and the air in the dish chamber being expanded suddenly as the hot water comes in contact therewith. Such liberation of steam and/or air expansion results in a pressure increase in the dish chamber 14 which produces an upward surge from the sump 28 into the space 90, this upward surge tending to carry water upwardly through the space 90 as the pressure increase is dissipated through the escape passage formed by the gap 122 and the escape passage formed by the space 116, flow through the latter being indicated by the arrow 164. To some extent, the slight tortuosity of the space 90 causes water drops which tend to be carried upwardly to impinge on the front wall of the sump and the rear wall of the door, these water drops draining back into the sump since the rear wall of the door is located rearwardly of and extends below the upper edge of the front wall of the sump. Also, the rearwardly extending lip 128 minimizes water entrainment in the stream entering the space 90.

It will be noted that since the flange 120 of the front wall 30 of the sump 28 and the drainage lip 124 on the intermediate wall 98 of the door provide an escape gap 122 for excess air and steam which slopes upwardly and forwardly and thus diverges from the chamber provided by the spaces 90 and 116, any water drops or droplets carried upwardly through the space 90 cannot readily enter the gap 122, but, instead, are carried upwardly toward and into the upwardly converging space 116 between the intermediate wall 98 and the rear wall 64 of the door. This upwardly convergent space 116 acts to throttle the upward flow of air, steam and water into the space 76 between the front and rear walls 62 and 64 of the door above the partition 98 so that water drops or droplets cannot be carried upwardly above the partition. Thus, the spaces 90 and 116 provide, in effect, a surge chamber which absorbs the upward surge from the sump 28 resulting from a pressure increase in the dish chamber 14, any water droplets entrained in the air and steam surging upwardly in this manner being carried upwardly into the space 116 and being prevented from escaping through the gap 122 because of its forward divergence from the generally vertical surge chamber provided by the spaces 90 and 116. At the same time, however, the gap 122 permits the escape of air and steam to dissipate the pressure increase in the dish chamber 14, the space 116 also performing this function.

Any water drops or droplets carried upwardly into the upwardly converging space 116 ultimately impinge on either the intermediate wall 98 of the door, or on the forwardly offset portion 118 of the rear wall 64 thereof, and drain back down into the sump 28 through the spaces 116 and 90. As will be apparent, any water impinging on the partition 98 is deflected inwardly to a position rearwardly of the upper edge of the flange 120 by the drainage lip 124 so that drainage of such water back into the sump 28 is assured.

Thus, the structure described provides an effective means for absorbing upward surges from the sump 28 and for separating free water from the air and steam surging upwardly, the free water being drained back into the sump while the excess air and steam escape through the forwardly diverging gap 122.

Considering now the manner in which ambient air is circulated through the door 24 to cool the front wall of the dish chamber 14, i. e., the rear wall 64 of the door 24, as dishes are being dried in the dish chamber 14 by condensation of moisture from the air circulating within the dish chamber on the inner surfaces of the dish chamber walls as hereinbefore discussed, the fan 50 draws air into the space 20 between the dish chamber 14 and the cabinet 18 through the inlet 58 and circulates this air throughout the space 20 between all of the walls of the dish chamber and the corresponding walls of the cabinet. As best shown in Fig. 4 of the drawings, there is an air passage 130 between the front wall of the cabinet 18 below the doorway 22 and the front wall 30 of the sump 28, air discharged by the fan 50 flowing upwardly through this air passage into the space 88 between the front wall of the sump and the front wall 62 of the door, as indicated by the arrows 132. The air introduced into the space 88 in this manner flows upwardly therein and through the air openings 110 in the flange extension 106 into the space 114 between the front wall 62 of the door and the partition 98, as indicated by the arrow 134. This air flows upwardly through the space 114, as indicated by the arrow 136, into and upwardly through the space 76, as indicated by the arrows 138. Once this upwardly flowing air passes the upper edge of the partition 98, it flows over the outer surface of the rear wall 64 of the door 24 to cool the inner surface thereof to promote condensation of moisture from the moisture-laden air being circulated within the dish chamber 14. As will be apparent, the partition 98 occupies a relatively small proportion of the vertical extent of the rear wall 64 of the door so that flowing air upwardly through the door 24 in this manner cools a substantial portion of the rear wall of the door for the purposes of moisture condensation on the inner surface of such rear wall.

The air caused to flow upwardly through the door 24 in the foregoing manner escapes, as indicated by the arrow 139 in Fig. 3 of the drawings, from the space 76 between the front and rear walls 62 and 64 of the door through an air outlet 140 in the front wall 62 of the door adjacent the upper edge thereof. The air outlet 140, which may comprise a single opening extending across the top of the door, or which may comprise a plurality of spaced openings, is concealed by the depending flange 80 of the handle 78. It will be noted that the air flowing upwardly through the space 76 flows through that portion thereof which forms the controls compartment 56. Consequently, the air circulated through the door dries the controls 54 in the compartment 56 to eliminate any moisture from the controls compartment which may be present as the result of the escape of steam upwardly into the space 76 above the partition 98 through the upwardly converging space 116 between this partition and the forwardly offset portion 118 of the rear wall 64 of the door 24. Thus, circulating air through the door 24 in this manner also maintains the controls 54 dry, in addition to cooling the rear wall 64 of the door for the purpose of condensing moisture from the air within the dish chamber 14 during the drying operation.

The air circulated throughout the rest of the space 20 between the dish chamber walls and the cabinet walls by the fan 50 during the drying operation escapes from this space in either of two ways. Part of the air may escape from the space 20 through a gap 142 between the upper edge of the door 24 and the cabinet 18, as indicated by the arrow 144 in Fig. 3 of the drawings, the gap 142 communicating with that portion of the space 20 which is between the top walls of the dish chamber 14 and the cabinet 18. The remaining air escapes from that portion of the space which is between the top walls of the dish chamber 14 and the cabinet 18 through an air inlet 146 into the space 76 in the door, as indicated by the arrow 148 in Fig. 3 of the drawings. The air inlet 146, which may include a single opening extending across the door, or a plurality of spaced openings, is formed in the rear wall 64 of the door adjacent the upper edge thereof. As will be apparent, the air entering the space 76 in the door through the air inlet 146 escapes through the air outlet 140, along with the air circulated upwardly through the door in the manner hereinbefore described.

It should be pointed out that any air and/or steam emanating from the dish chamber 14 through the gap 122 either escapes downwardly through the door 24 between the front wall 30 of the sump 28 and the front wall 62 of the door, or escapes upwardly through the door along the path designated by the arrows 136, 138 and 139. Air and/or steam escaping through the space 116 is discharged upwardly through the door along the path designated by the arrows 164, 138 and 139.

As shown in Fig. 6, the gap 122 may be closed, if desired, by means of a seal 160 extending across the door 24 and engaging the edge of the sump flange 120 when the door is closed, this seal being seated against the flange 104 of the intermediate wall 98 and being retained by a clip or clips 162. The seal 160 thus completely eliminates any possibility of water escaping over the upper edge of the front wall 30 of the sump 28. In this embodiment, air and/or steam emanating from the dish chamber 14 escapes upwardly through the door 24 along the path designated by the arrows 164, 138 and 139 only, the operation otherwise being identical to that hereinbefore described.

Thus, the present invention provides a door which includes means for preventing the escape of liquid from the dish chamber 14 while permitting the escape of excess air or steam therefrom, and includes means for cooling the rear wall 64 of the door for the purpose of condensing moisture from the air being circulated within the dish chamber during the drying operation, which are important features.

Although exemplary embodiments of the present invention have been disclosed herein for purposes of illustration, it will be understood that various changes, modifications and substitutions may be incorporated in such embodiments without departing from the spirit of the invention as defined by the claims which follow.

We claim:

1. In a dishwasher, the combination of: a housing including a dish chamber and having a front provided with a doorway for access to the interior of said dish chamber, said dish chamber providing at the bottom thereof a sump having a front wall adjacent the bottom of said doorway; a door adapted to close said doorway and including spaced front and rear walls which straddle said front wall of said sump when said door is closed; means providing within said door a generally vertical surge chamber which communicates with said sump between said front wall thereof and said rear wall of said door when said door is closed; means providing within said door a discharge passage communicating with the upper end of said surge chamber and with the exterior of said dishwasher; and means pivotally connecting said door to said housing for movement between open and closed positions about a horizontal pivot axis located adjacent the bottoms of said doorway and said door and located forwardly of and below the upper edge of said front wall of the sump.

2. In a dishwasher, the combination of: a housing including a dish chamber and having a front provided with a doorway for access to the interior of said dish chamber, said dish chamber providing at the bottom thereof a sump having a front wall adjacent the bottom of said doorway; and a door adapted to close said doorway and pivotally connected to said housing for movement between open and closed positions about a horizontal pivot axis adjacent the bottoms of said doorway and said door, said door including a rear wall which is spaced rearwardly from and which extends below the upper edge of said front wall of said sump when said door is closed, said door including another wall which is spaced forwardly from said rear wall of said door and which is located at a level above said front wall of said sump when said door is closed, said other wall of said door being located in close proximity to said rear wall thereof so that upward flow from said sump through the space between said rear wall of said door and said front wall of said sump into the space between said rear wall of said door and said other wall thereof is throttled, and said door having therein a discharge passage which communicates with the upper end of the space between said rear wall of said door and said other wall thereof and which communicates with the exterior of said dishwasher.

3. A dishwasher according to claim 2 wherein said rear wall of said door is offset rearwardly adjacent its lower edge.

4. A dishwasher according to claim 2 including a seal engaging said other wall of said door and said front wall of said sump when said door is closed.

5. In a dishwasher, the combination of: a housing including a dish chamber and having a front provided with a doorway for access to the interior of said dish chamber, said dish chamber providing at the bottom thereof a sump having a front wall adjacent the bottom of said doorway; and a door adapted to close said doorway and pivotally connected to said housing for movement between open and closed positions about a horizontal pivot axis adjacent the bottoms of said doorway and said door, said door including a rear wall which is spaced rearwardly from said front wall of said sump when said door is closed, said door including another wall which is spaced forwardly from said rear wall of said door and which is located at a level above said front wall of said sump when said door is closed, said other wall of said door being located in close proximity to said rear wall thereof so that upward flow from said sump through the space between said rear wall of said door and said front wall of said sump into the space between said rear wall of said door and said other wall thereof is throttled, and said door including a drainage lip carried by and sloping downwardly and rearwardly from said other wall of said door, said drainage lip being located rearwardly of and at a level above the upper edge of said front wall of said sump when said door is closed.

6. In a dishwasher, the combination of: a housing including a dish chamber and having a front provided with a doorway for access to the interior of said dish chamber, said dish chamber providing at the bottom thereof a sump having a front wall adjacent the bottom of said doorway; and a door adapted to close said doorway and pivotally connected to said housing for movement between open and closed positions about a horizontal pivot axis adjacent the bottoms of said doorway and said door, said door including spaced front and rear walls which straddle and are spaced from said front wall of said sump when said door is closed, said door including another, intermediate wall which is located between and spaced from said front and rear walls of said door and which is located at a level between the upper and lower edges of said front and rear walls of said door and at a level above said front wall of said sump when said door is closed, said intermediate wall of said door being located in close proximity to said rear wall thereof so that upward flow from said sump through the space between said rear wall of said door and said front wall of said sump into the space between said rear wall of said door and said intermediate wall thereof is throttled.

7. In a dishwasher, the combination of: a housing including a dish chamber and having a front provided with a doorway for access to the interior of said dish chamber, said dish chamber providing at the bottom thereof a sump having a front wall adjacent the bottom of said doorway; and a door adapted to close said doorway and pivotally connected to said housing for movement between open and closed positions about a horizontal pivot axis adjacent the bottoms of said doorway and said door, said door including spaced front and rear walls which straddle and are spaced from said front wall of said sump when said door is closed, said door including another, intermediate wall which is located between and spaced from said front and rear walls of said door and which is located at a level between the upper and lower edges of said front and rear walls of said door and at a level above said front wall of said sump when said door is closed, said intermediate wall of said door being located in close proximity to said rear wall thereof so that upward flow from said sump through the space between said rear wall of said door and said front wall of said sump into the space between said rear wall of said door and said intermediate wall thereof is throttled, and said door including a drainage lip carried by and sloping downwardly and rearwardly from said intermediate wall of said door, said drainage lip being located inwardly of and at a level above the upper edge of said front wall of said sump when said door is closed.

8. A dishwasher as defined in claim 7 including means for circulating air upwardly through the space between said front wall of said sump and said front wall of said door, through the space between said intermediate wall of said door and said front wall thereof, and into the space between said front and rear walls of said door above said intermediate wall thereof.

9. In a dishwasher, the combination of: a housing including a dish chamber and having a front provided with a doorway for access to the interior of said dish chamber, said dish chamber providing at the bottom thereof a sump having a front wall adjacent the bottom of said doorway; and a door adapted to close said doorway and pivotally connected to said housing for movement between open and closed positions about a horizontal pivot axis adjacent the bottoms of said doorway and said door, said door including spaced front and rear walls which straddle and are spaced from said front wall of said sump when said door is closed, said rear wall of said door including a forwardly offset portion which is located intermediate its upper and lower edges and which is located at a level above said front wall of said sump when said door is closed, said door including another, intermediate wall which is located between and spaced from said front and rear walls of said door and which is located at a level between the upper and lower edges of said front and rear walls of said door and which is located at a level above said front wall of said sump when said door is closed, said intermediate wall of said door being located in close proximity to said forwardly offset portion of said rear wall thereof so that upward flow from said sump through the space between said rear wall of said door and said front wall of said sump into the space between said forwardly offset portion of said rear wall of said door and said intermediate wall thereof is throttled.

10. In a dishwasher, the combination of: a housing including a dish chamber and having a front provided with a doorway for access to the interior of said dish chamber, said dish chamber providing at the bottom thereof a sump having a front wall adjacent the bottom of said doorway; and a door adapted to close said doorway and pivotally connected to said housing for movement between open and closed positions about a horizontal pivot axis adjacent the bottoms of said doorway and said door, said door including spaced front and rear walls which straddle and are spaced from said front wall of said sump when said door is closed, said rear wall of said door including a forwardly offset portion which is located intermediate its upper and lower edges and which is located at a level above said front wall of said sump when said door is closed, said door including another, intermediate wall which is located between and spaced from said front and rear walls of said door and which is located at a level between the upper and lower edges of said front and rear walls of said door and which is located at a level above said front wall of said sump when said door is closed, said intermediate wall of said door being located in close proximity to said forwardly offset portion of said rear wall thereof so that upward flow from said sump through the space between said rear wall of said door and said front wall of said sump into the space between said forwardly offset portion of said rear wall of said door and said intermediate wall thereof is throttled, and said door including a drainage lip carried by and sloping downwardly and rearwardly from said intermediate wall of said door, said drainage lip being located rearwardly of and at a level above the upper edge of said front wall of said sump when said door is closed, whereby to drain moisture collecting on said intermediate wall of said door adjacent said forwardly offset portion of said rear wall thereof downwardly into said sump rearwardly of said front wall of said sump.

11. In a dishwasher, the combination of: a housing including a dish chamber and having a front provided with a doorway for access to the interior of said dish chamber, said dish chamber providing at the bottom thereof a sump having a front wall adjacent the bottom of said doorway; a door adapted to close said doorway and pivotally connected to said housing for movement between open and closed positions about a horizontal pivot axis adjacent the bottoms of said doorway and said door, said door including spaced front and rear walls which straddle and are spaced from said front wall of said sump when said door is closed, said rear wall of said door including a forwardly offset portion which is located intermediate its upper and lower edges and which is located at a level above said front wall of said sump when said door is closed, said door including another, intermediate wall which is located between and spaced from said front and rear walls of said door and which is located at a level between the upper and lower edges of said front and rear walls of said door and which is located at a level above said front wall of said sump when said door is closed, said intermediate wall of said door being located in close proximity to said forwardly offset portion of said rear wall thereof so that upward flow from said sump through the space between said rear wall of said door and said front wall of said sump into the space between said forwardly offset portion of said rear wall of said door and said intermediate wall thereof is throttled, and said door including a drainage lip carried by and sloping downwardly and rearwardly from said intermediate wall of said door, said drainage lip being located rearwardly of and at a level above the upper edge of said front wall of said sump when said door is closed, whereby to drain moisture collecting on said intermediate wall of said door adjacent said forwardly offset portion of said rear wall thereof downwardly into said sump rearwardly of said front wall of said sump; and means for flowing air upwardly through the space between said front wall of said sump and said front wall of said door, through the space between said intermediate wall of said door and said front wall thereof, and into the space between said front and rear walls of said door above said intermediate wall thereof.

12. A dishwasher as defined in claim 11 wherein said housing includes a cabinet surrounding and spaced from said dish chamber, the space between said dish chamber and said cabinet communicating with said space between said front wall of said door and said front wall of said sump, said air flowing means being located in said space between said dish chamber and said cabinet.

13. A dishwasher as defined in claim 10 wherein said front wall of said sump is provided at the upper edge thereof with an upwardly and forwardly sloping flange, said drainage lip being directly above and in close proximity to said flange when said door is closed.

14. A dishwasher as defined in claim 13 wherein said front wall of said sump is provided with a rearwardly offset portion intermediate its lower edge and said flange.

15. A dishwasher according to claim 10 wherein said pivot axis is located forwardly of and below the upper edge of said front wall of said sump.

16. In a dishwasher, the combination of: a housing including a dish chamber and having a front provided with a doorway for access to the interior of said dish chamber, said dish chamber providing at the bottom thereof a sump having a front wall adjacent the bottom of said doorway; a door adapted to close said doorway and pivotally connected to said housing for movement between open and closed positions about a horizontal pivot axis adjacent the bottoms of said doorway and said door, said door including spaced front and rear walls which straddle and are spaced from said front wall of said sump when said door is closed, said rear wall of said door including a forwardly offset portion which is located intermediate its upper and lower edges and which is located at a level above said front wall of said sump when said door is closed, said door including another, intermediate wall which is located between and spaced from said front and rear walls of said door and which is located at a level between the upper and lower edges of said front and rear walls of said door and which is located at a level above said front wall of said sump when said door is closed, said intermediate wall of said door being located in close proximity to said forwardly offset portion of said rear wall thereof so that upward flow from said sump through the space between said rear wall of said door and said front wall of said sump into the space between said forwardly offset portion of said rear wall of said door and said intermediate wall thereof is throttled, and said door including a drainage lip carried by and sloping downwardly and rearwardly from said intermediate wall of said door, said drainage lip being located rearwardly of and at a level above the upper edge of said front wall of said sump when said door is closed, whereby to drain moisture collecting on said intermediate wall of said door adjacent said forwardly offset portion of said rear wall thereof downwardly into said sump rearwardly of said front wall of said sump; and means for flowing air upwardly through the space between said front wall of said sump and said front wall of said door, through the space between said intermediate wall of said door and said front wall thereof, and into the space between said front and rear walls of said door above said intermediate wall thereof, said front wall of said door being provided with an air outlet adjacent the upper edge of said door for the exhaust of air flowing upwardly into said space between said front and rear walls of said door above said intermediate wall thereof.

17. A dishwasher as defined in claim 16 wherein said housing includes a cabinet enclosing and spaced from said dish chamber, said space between said front wall of said sump and said front wall of said door communicating with the space between said dish chamber and said cabinet, said air flowing means being located in said space between said dish chamber and said cabinet and acting to flow air throughout said space between said dish chamber and said cabinet as well as through said space between said front wall of said sump and said front wall of said door.

18. A dishwasher as defined in claim 16 wherein said housing includes a cabinet enclosing and spaced from said dish chamber, said space between said front wall of said sump and said front wall of said door communicating with the space between said dish chamber and said cabinet, said air flowing means being located in said space between said dish chamber and said cabinet and acting to flow air throughout said space between said dish chamber and said cabinet as well as through said space between said front wall of said sump and said front wall of said door, said rear wall of said door having an air inlet adjacent the top thereof which communicates with said space between said dish chamber and said cabinet when said door is closed, whereby air circulated throughout said space between said dish chamber and said cabinet by said air flowing means flows through said air inlet into the space between said front and rear walls of said door above said intermediate wall thereof and flows out of said space between said front and rear walls of said door above said intermediate wall thereof through said air outlet.

19. In a dishwasher, the combination of: a housing including a dish chamber and having a front provided with a doorway for access to the interior of said dish chamber, said housing including a cabinet spaced from and enclosing said dish chamber; a door adapted to close said doorway and pivotally connected to said housing for movement between open and closed positions about a horizontal pivot axis adjacent the bottoms of said doorway and said door, said door including spaced front and rear walls, the space between said front and rear walls of said door communicating adjacent the bottom of said door with the space between said dish chamber and said cabinet, said front wall of said door having an air outlet adjacent the upper edge of said door, and said rear wall of said door having an air inlet which is located adjacent the upper edge of said door and which communicates with said space between said dish chamber and said cabinet when said door is closed; and air flowing means in said space between said dish chamber and said cabinet for circulating air through said space between said front and rear walls of said door and out said air outlet in said front wall of said door, and for circulating air throughout said space between said dish chamber and said cabinet, through said air inlet in said rear wall of said door, through said space between said rear and front walls of said door, and out said air outlet in said front wall of said door.

20. In a dishwasher, the combination of: a housing including a dish chamber and having a front provided with a doorway for access to the interior of said dish chamber, said dish chamber providing at the bottom thereof a sump having a front wall adjacent the bottom of said doorway; and a door adapted to close said doorway and pivotally connected to said housing for movement between open and closed positions about a horizontal axis adjacent the bottoms of said doorway and said door, said door including a rear wall which is spaced rearwardly from said front wall of said sump when said door is closed and which extends below the upper edge of said front wall of said sump, said door having means therein providing a surge chamber above and communicating with the space between said rear wall of said door and said front wall of said sump, said door having a discharge passage therein communicating with the upper end of said surge chamber and with the exterior of said dishwasher, and said door having means therein for draining back into said sump rearwardly of said front wall thereof any water carried upwardly into said surge chamber.

21. In a dishwasher, the combination of: a housing including a dish chamber and having a front provided with a doorway for acess to the interior of said dish chamber, said dish chamber providing at the bottom thereof a sump having a front wall adjacent the bottom of said doorway; and a door adapted to close said doorway and movable between open and closed positions, said door, when in said closed position, providing a generally vertical, upwardly converging surge chamber which communicates with said sump, and said door and said front wall of said sump providing therebetween an exhaust for gases or vapors which communicates with said surge chamber and which is inclined upwardly and forwardly therefrom.

22. In a dishwasher, the combination of: a housing including a dish chamber and having a front provided with a doorway for access to the interior of said dish chamber, said dish chamber providing at the bottom thereof a sump having a front wall adjacent the bottom of said doorway; and a door adapted to close said doorway and movable between open and closed positions, said door, when in said closed position, providing a generally vertical, upwardly converging surge chamber which communicates with said sump below and rearwardly of the upper edge of said front wall thereof, and providing an exhaust for gases or vapors which communicates with said surge chamber and with the exterior of said dishwasher.

References Cited in the file of this patent

UNITED STATES PATENTS

| | | |
|---|---|---|
| 2,620,811 | Walker | Dec. 9, 1952 |
| 2,635,941 | Stoddard | Apr. 21, 1953 |
| 2,657,697 | Walker | Nov. 3, 1953 |
| 2,707,961 | Geiger | May 10, 1955 |